G. P. EUSTIS.
COMBINED CAR WHEEL AND AXLE.
APPLICATION FILED OCT. 4, 1910.
990,196.
Patented Apr. 18, 1911.
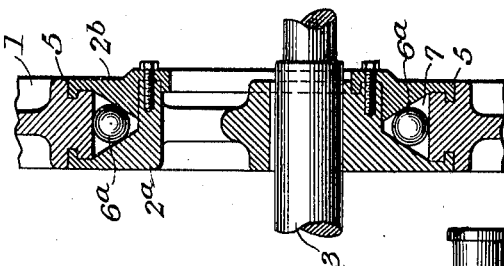
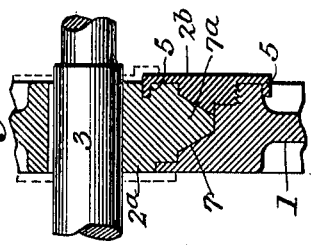
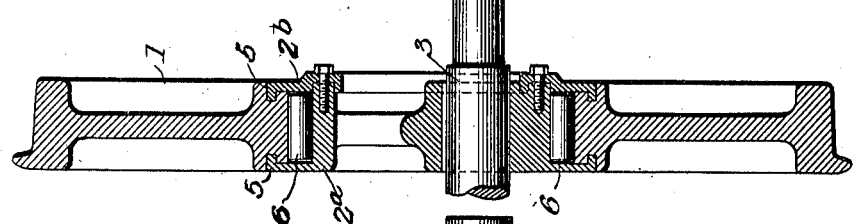
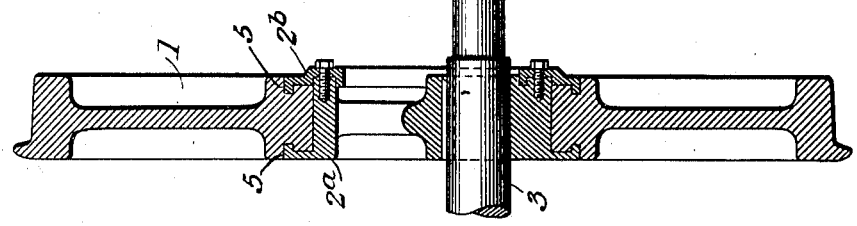
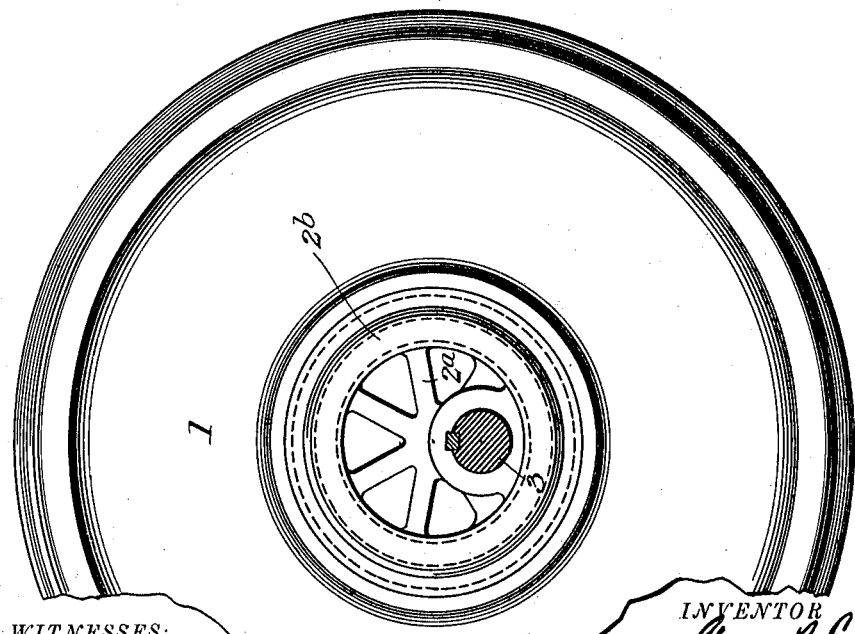
WITNESSES:
Raymond F. Barnes.
Charles Lovell Howard.
INVENTOR
George P. Eustis,
BY
ATTORNEYS.

UNITED STATES PATENT OFFICE.

GEORGE P. EUSTIS, OF WASHINGTON, DISTRICT OF COLUMBIA.

COMBINED CAR WHEEL AND AXLE.

990,196.     Specification of Letters Patent.     Patented Apr. 18, 1911.

Application filed October 4, 1910. Serial No. 585,344.

*To all whom it may concern:*

Be it known that I, GEORGE P. EUSTIS, a citizen of the United States, residing at Washington, in the District of Columbia, have invented a new and useful Improvement in Combined Car Wheels and Axles, of which the following is a specification.

Broadly considered, my invention relates to an improved car wheel and axle combined in which the axle is, relatively speaking, non-rotative, and instead of being placed centrally of the wheel proper, is eccentrically and rigidly attached to what I term an internal cam upon or around which the main or supporting wheel which rests upon the track revolves. Thus the eccentrically arranged axle is lowered from the customary position and forms part of an independent and relatively non-rotative body concentric to the wheel proper.

It is known that in starting and stopping a car or train equipped with ordinary wheels and axles there is a certain amount of jerk or concussion, but this I avoid by the shifting action consequent upon the relations existing between the rotative wheel proper and the relatively non-rotative internal cam which, though concentric with the wheel proper, has its axle eccentrically fixed with respect to itself, whereby there is a tendency to automatically start or stop the car or train by the shifting of its own weight according to the pull forward or push backward of the motive power. As a consequence wear and tear are reduced proportionately to the reduction of jerk or concussion, inasmuch as such relative rotative action as exists between the cam and the wheel proper is such as to produce a sensible flexibility. In starting or stopping a car or train equipped with wheels and axles combined in accordance with my invention, the weight of the car or train by the pulling or backing of it is pulled forward or pushed backward of the centers of gravity of the cam and the wheel proper. Furthermore, the power of the brake when used with my invention is increased, for the application of the brake at the back of the wheel will push it forward and throw the weight of the car behind the centers of gravity, thereby automatically checking the speed by the shifting of the load. While this is a statement of the broad character of my invention, other features of improvement are included therein which, with the advantages attending their use, will be described hereinafter.

In the accompanying drawings,—Figure 1 is a side view of my invention. Fig. 2 is a vertical section thereof. Figs. 3, 4 and 5 show modifications also in vertical section.

While the details of construction may be variously modified, I present in the drawing an operative device and modifications thereof, the features of which may be described as follows:

1 represents the wheel proper, while except in the modification Fig. 5 a two-part cam is shown by $2^a$, $2^b$.

3 is the axle.

The wheel 1 may be of ordinary construction except as to changes adapting it to receive the cam. The main part $2^a$ of the cam may be ribbed or perforated as shown for purposes of lightness, although it must be given the necessary strength. The axle 3 is rigidly connected to the main part of the cam, being keyed thereto as shown, and as its center is below that of the wheel, the car is lowered from the customary height, thus facilitating entrance and exit. The construction is such that the annulus $2^b$ is removable from the main part $2^a$, it being attached thereto in any convenient manner, as by bolts as seen in Figs. 2, 3 and 4. The two parts of the cam are provided with inturned annular edges 5 which fit in annular grooves of the wheel.

In the modification, Fig. 3, an annular space is provided between the cam and the wheel in which are placed antifriction rollers 6 to which oil may be supplied through any suitable duct, finding its way to the connections between the cam and the interfitted wheel.

In Fig. 4 a further modification is shown in which the annular space or channel for the antifriction devices is V-shaped, and under this form of my invention balls $6^a$ are employed.

In Fig. 5 a further modification is shown in which the perimeter of the cam $2^a$ is cone shaped in cross section as shown at $7^a$ fitting a similarly shaped cavity formed by the inclined side 7 of the body of the wheel and the correspondingly inclined side of the annulus $2^b$, the latter being screwed upon the body of the wheel as shown.

In each form in which my invention is shown the rotation of the wheel upon the cam resembles that of the free rotation of a wheel on a fixed axis, although the relations between the cam and the wheel proper are such as to allow of the shifting of centers hereinbefore mentioned.

While the variously modified constructions herein shown whereby the cam and the wheel proper are fitted together are such as will exclude water, dirt or other extraneous matter, it may be advisable to bolt at each side of the cam a water and dirt proof case, as indicated by dotted lines in Fig. 5.

My invention is adapted to all classes of railway rolling stock and to any mechanical use in which a wheel and axle are required; and when applied to railroad use has an important advantage in that the wheels are independently rotatable, thus greatly reducing the wear and tear of the rails at curves and also preventing drag of the inside wheel whereby wear on the wheel itself is reduced to a minimum.

It will be understood that while a water and dirt proof case for the exclusion of extraneous matter from the operative parts is only shown at each side of the cam in Fig. 5, such cases may be similarly applied to each of the several forms under which my invention is presented.

Reference is hereby made to my copending application Serial No. 585,345, filed Oct. 4, 1910, in which is shown an invention operating upon the same general principle as that of the device herein claimed but embodying differences in structure.

Having thus described my invention, I claim:—

1. In a car wheel and axle combined, a wheel proper having a tire with an integral flange, a central internal cam, the wheel and cam being rotatively fitted together, and an axle directly secured to the cam and having its center eccentric to that of the wheel proper, substantially as set forth.

2. In a car wheel and axle combined, a wheel proper, an internal two-part cam concentric to said wheel, one of the parts of said cam consisting of an annulus removable from the other part, and an axle directly and eccentrically secured to the main part of said cam, the two-membered cam and the wheel proper being rotatively interfitted together, substantially as set forth.

3. In a car wheel and axle combined, a wheel proper, an internal two-part cam concentric to said wheel, one of the parts of said cam consisting of an annulus removable from the other part thereof, and an axle directly secured to the main part of the cam and eccentric thereto, each part of said cam having an inclined side whereby is formed a lubricant reservoir, substantially as set forth.

4. In a car wheel and axle combined, a wheel proper, an internal two-part cam concentric thereto, an axle keyed eccentrically to the main element of the cam, the wheel and cam being rotatively interfitted together and a channel being formed between them, and a series of antifriction members in said channel, substantially as set forth.

5. In a car wheel and axle combined, a wheel proper, an internal two-part cam concentric thereto, an axle keyed eccentrically to the main element of the cam, the wheel and cam being rotatively interfitted together and a V-shaped channel being formed between them, and a series of antifriction balls in said V-shaped channel, substantially as set forth.

6. In a car wheel and axle combined, a wheel proper, a central internal cam, the wheel and cam being rotatively fitted together, an axle directly secured to the cam and having its center eccentric to that of the wheel proper, and means attached to each side of the cam for excluding extraneous matter from the interior parts, substantially as set forth.

In testimony whereof I affix my signature in presence of two witnesses.

GEORGE P. EUSTIS.

Witnesses:
CHARLES LOWELL HOWARD,
E. G. MARSHALL.